(12) United States Patent
Latyshev

(10) Patent No.: US 6,992,402 B2
(45) Date of Patent: Jan. 31, 2006

(54) WIND-DRIVEN POWER STATION

(76) Inventor: Sergei Latyshev, Jasmin alley 2/6, Jerusalem (IL)

( * ) Notice: Subject to any disclaimer, the term of this patent is extended or adjusted under 35 U.S.C. 154(b) by 149 days.

(21) Appl. No.: 10/790,107

(22) Filed: Mar. 2, 2004

(65) Prior Publication Data

US 2004/0164562 A1    Aug. 26, 2004

(51) Int. Cl.
*H02P 9/04* (2006.01)
*F03B 7/00* (2006.01)
(52) U.S. Cl. ............................. 290/55; 290/54; 290/44; 416/17
(58) Field of Classification Search .................. 290/43, 290/44, 54, 55; 416/7, 8, 9, 17
See application file for complete search history.

(56) References Cited

U.S. PATENT DOCUMENTS

| 3,730,643 | A | * | 5/1973 | Davison | 416/8 |
| 4,088,352 | A | * | 5/1978 | Kling | 290/55 |
| 4,114,046 | A | * | 9/1978 | Yousef | 290/55 |
| 4,168,439 | A | * | 9/1979 | Palma | 290/44 |
| 4,302,684 | A | * | 11/1981 | Gogins | 290/55 |
| 4,527,950 | A | * | 7/1985 | Biscomb | 416/117 |
| 4,589,344 | A | * | 5/1986 | Davison | 104/24 |
| 4,832,569 | A | * | 5/1989 | Samuelsen et al. | 416/17 |
| 5,134,305 | A | * | 7/1992 | Senehi | 290/55 |
| 5,215,015 | A | * | 6/1993 | Iida et al. | 104/23.1 |
| 5,758,911 | A | * | 6/1998 | Gerhardt | 290/55 |
| 5,992,341 | A | * | 11/1999 | Gerhardt | 114/102.16 |
| 6,614,125 | B2 | * | 9/2003 | Willis et al. | 290/55 |
| 6,888,264 | B1 | * | 5/2005 | Willis et al. | 290/55 |
| 6,936,932 | B2 | * | 8/2005 | Kenney | 290/1 R |

* cited by examiner

*Primary Examiner*—Nicholas Ponomarenko

(57) ABSTRACT

The wind-driven power station comprises a closed-loop rail track consisting of sections of gradual ascent and descent. The descent section directed upwind is positioned in an artificial tunnel. Basic elongated sections of the rail track are situated across the predominant wind direction in the given area. A carriage with a sail assembly and a generator, whose rotor is connected to the wheel axis, moves along the rail track. A wind directing device is positioned along the basic elongated sections of the track and designed to direct wind upon said sail assembly. Wind flows which pass through channels of the wind directing device change their direction and from the rear push the sail assembly of the carriages and set them into motion. The carriage wheel rotation leads to generator rotor rotation and generation of current.

At all sections of the rail track the carriages are affected by forces pushing them in the same direction.

5 Claims, 9 Drawing Sheets

WIND-DRIVEN POWER STATION

FIELD OF THE INVENTION

The present invention relates to wind-power stations which transform kinetic energy of the wind into electric energy.

DESCRIPTION OF THE RELATED ART

BACKGROUND OF THE INVENTION

As a result of economic activity of a man the amount of main fossil (coal, oil, natural gas) energy sources of the earth gradually decreases. Also there is a problem of their production cost and delivery to customers, contamination of environment and the greenhouse effect due to their use. Therefore it is necessary to use alternative energy sources and generate, as a result, electric power. Currently there are solar, wind, geothermal, tidal power stations.

Wind-power stations—Windmills have been widely used at present. A tower is set up on a land area and at the top of the tower there is a generator which is connected via an axis to a propeller. Under the effect of the wind flow the propeller rotates and it activates the generator rotor. Thus electric power is generated. Wind-power stations—windmills possess a number of drawbacks. Thus, for instance, a heavy generator together with a propeller is placed on the top of the tower and when the propeller and the generator rotor rotate the structure is influenced by vibration and air flow turbulence. To increase stability, safety and long life of the wind-power station the tower should be made of special high-strength materials and be placed on a reliable foundation. Also due to the fact that main assemblies and parts are mounted on the top of the tower their current service and maintenance is difficult and expensive. Thus wind-power stations—windmills are low effective, have high cost in construction and are expensive in service and maintenance. To make a more effective wind-power station some structures of this kind have been projected and patented in which carriages with a rigid sail move by the wind along a closed-loop track.

See U.S. Pat. No. 4,302,684, in which a closed-loop oval track positioned at the same height level. Multiple wheeled support structures move along the track. At each wheeled support structure there is a vertical sail (wing) which rotates freely around a vertical axis and an electric generator connected to the wheel axis and designed to generate electricity when said wheeled support structures move along said track.

See U.S. Pat. No. 5,758,911, in which a closed-loop oval track positioned at the same height level. A plurality of carriages designed to move along the track. An electric generator designed to generate electricity when said carriages move along said track. Each carriage includes a sail (wing) as well as a sensor and controller systems designed for automatic control of said sail (wing) when said carriage move along said track.

SUMMARY OF THE INVENTION

It is a general object of the present invention to provide a wind-power station which is more effective, high-productive, easier in service and maintenance and with lower cost than wind-power stations used currently. This end is achieved by the fact that the present wind-power station possesses: a close-loop track has basic elongated sections positioned across the predominant wind direction in the given area and additional closing sections arranged, accordingly, down and up said predominant wind direction; said basic elongated sections together with one additional closing section situated downwind are made with a small gradual ascent and the basic elongated sections are positioned at different levels relative to height; said another additional closing section of the track positioned upwind is made with a smooth descent and placed in a tunnel; at least one carriage placed to move along said track; a sail assembly mounted on the said carriage; said sail assembly is formed by rigid plates concave relative to the wind flow, made from a high-strength light material and fixed to said carriage; at least one electric generator placed on said carriage is connected to the wheel axis and designed to generate electric power when carriage moves along said track; and a wind directing device is positioned as a leeward side along the basic elongated sections of the track and made as rigid edge-bent plates which from channels to direct wind upon said sail assemblies of said carriage. Wind flows which pass through channels between the plates of the wind directing device change their direction and from the rear push the plates of the sail assembly of carriage as well as the carriage rotating their wheels and generator rotors. Wind flows push plates of the sail assembly from the back and activate the carriage which is placed on the one additional closing section positioned down predominant wind direction. The carriage placed on this section of the track moves downwind. At the additional closed section of the track where the carriages move upwind they smoothly descent to the artificial tunnel with the head wind resistance absent. Thus, on all sections of the rail track carriages are affected by forces which push these carriages in the same direction. Generator rotor rotation generates electric power which is supplied by various poles to rail tracks and from there to electric power loads.

DETAILED DESCRIPTION OF THE PREFERRED EMBODIMENTS

Figure 1:
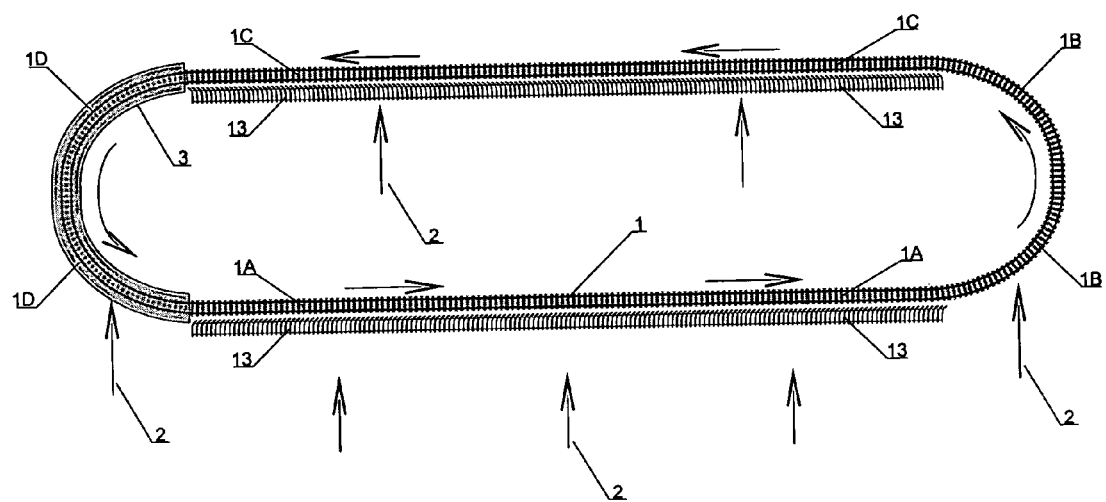
FIG. 1 is a top view of showing a wind-driven power station without railway carriages.
Figure 2:
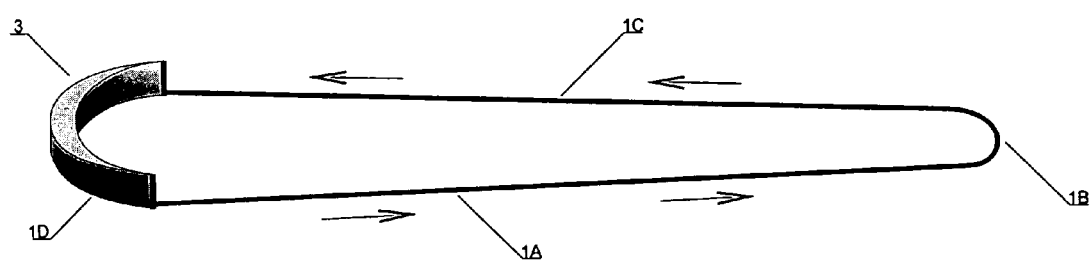
FIG. 2 is a front view of showing a wind-driven power station without railway carriages and wind direction device.
Figure 3:
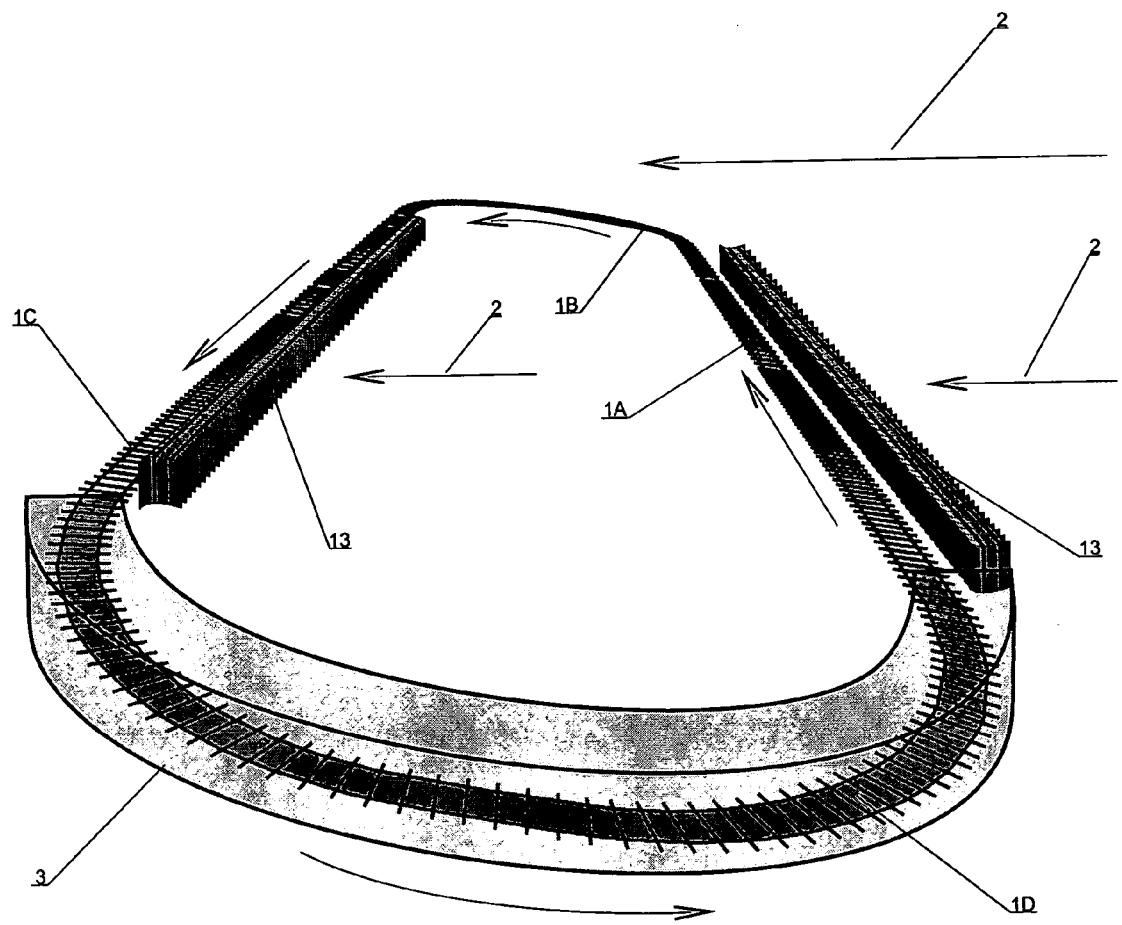
FIG. 3 is a side view in isometry of showing a wind-driven power station without railway carriages.
Figure 4:
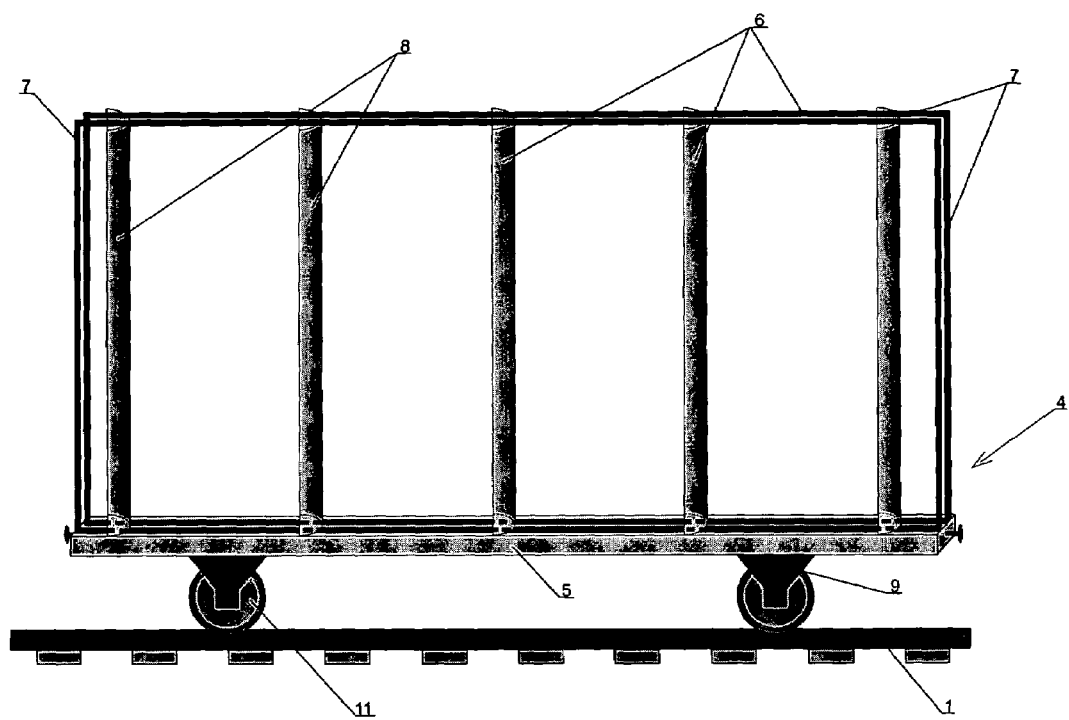
FIG. 4 is a side view of showing a railway carriage.
Figure 5:
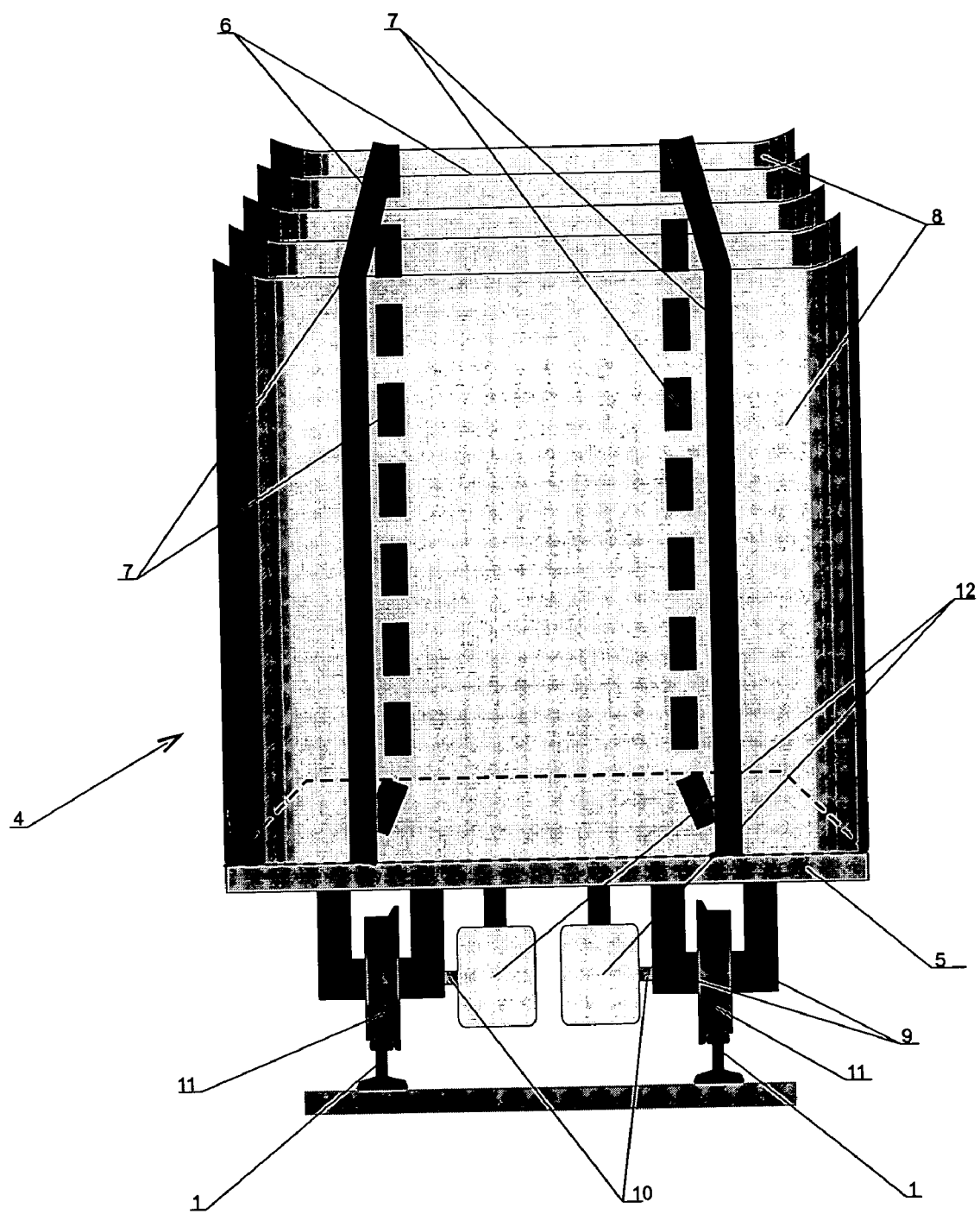
FIG. 5 is a front view of showing a railway carriage.
Figure 6:
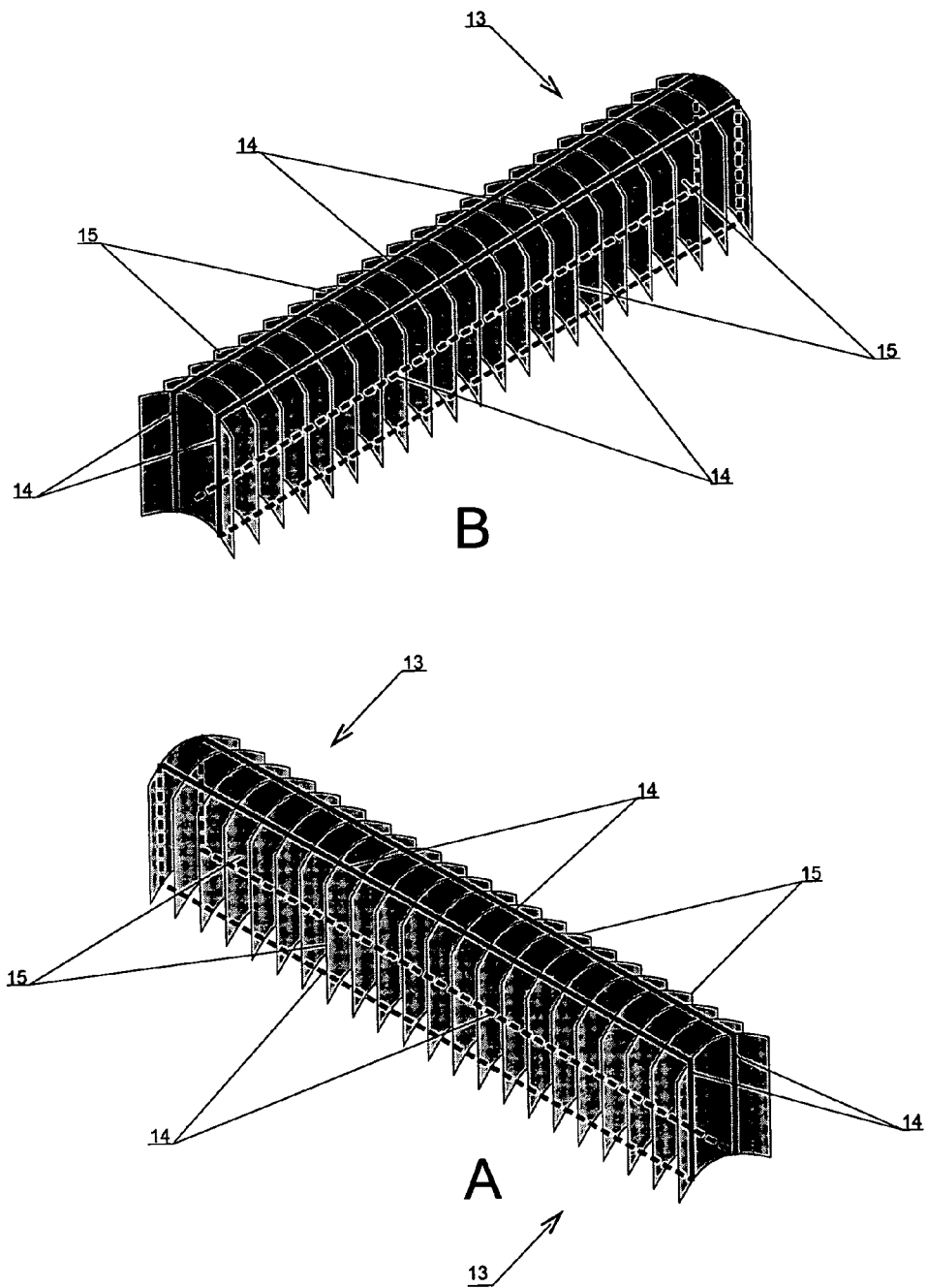
FIGS. 6a,b are view of showing a wind directing device.
Figure 7:
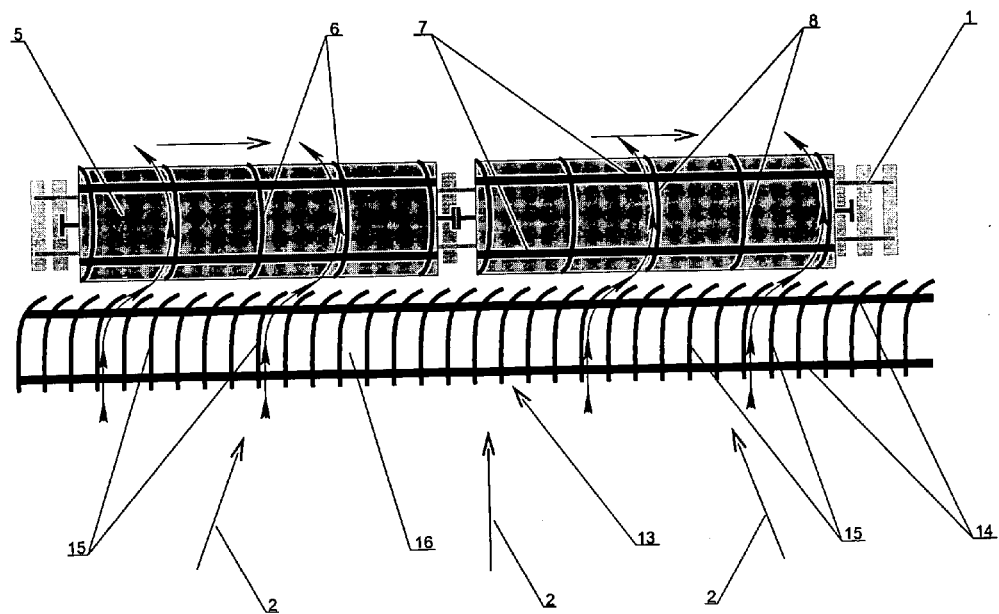
FIG. 7 is a top view of showing a fragment of front basic section of rail track with railway carriages.
Figure 9:
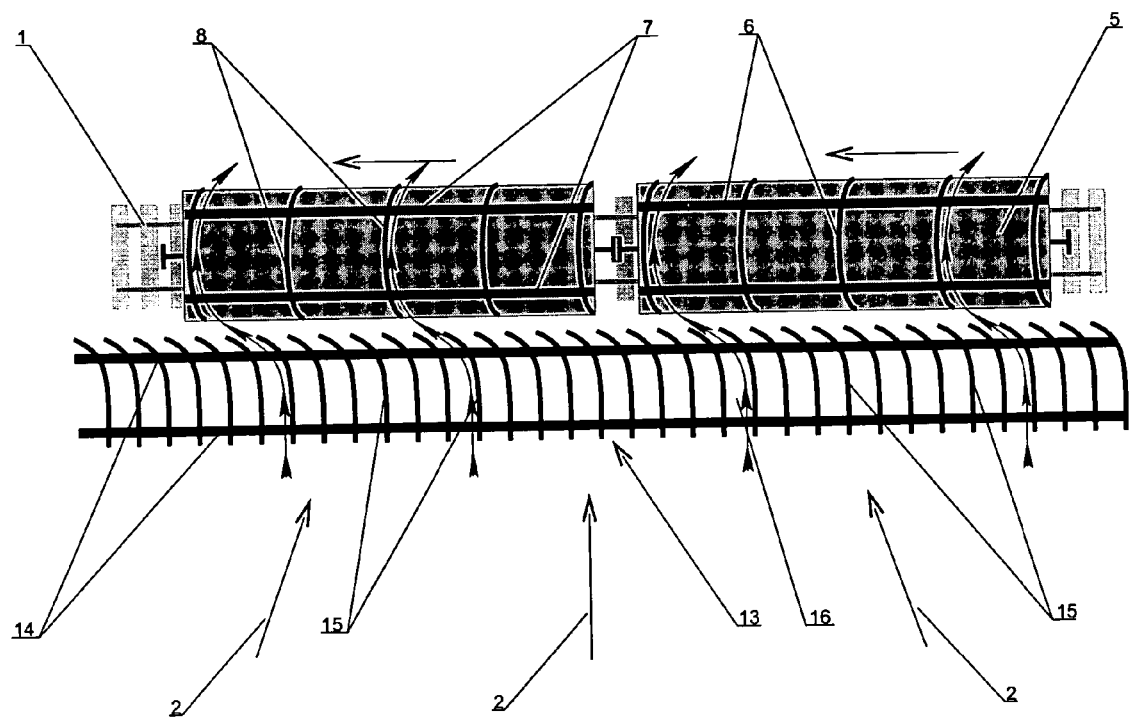
FIG. 9 is a top view of showing a fragment of back basic section of rail track with railway carriages.

The present wind-driven power station should be built in areas with a flat land surface where for most of the year there are constant winds of the same direction. The wind-driven power station (see FIGS. 1, 2, 3) comprises a closed-loop track 1. The closed-loop track consists of front 1A, right-hand side 1B, back 1C and left-hand side 1D sections. Said closed-loop track has front 1A and back 1C basic elongated sections positioned across the predominant wind direction 2 in the given area and right-hand 1B and left-hand 1D additional closing sections arrange, accordingly, down and up said predominant wind direction 2. Said front basic elongated section 1A, right-hand additional closing section 1B and back basic elongated section 1C of the track are made with a small gradual 0.5–1% ascent. Said back basic elongated section 1C is positioned at a higher level then the front basic elongated section 1A of the track. Said left-hand additional closing section 1D of the track positioned upwind is made with a smooth descent and placed in a tunnel 3. On said track 1 there is at least one carriage 4 (see FIGS. 4, 5). The carriage includes a chassis-body 5 upon which a sail assembly 6 is mounted. The sail assembly consists of two parallel vertical frames 7 which are rigidly fastened to the chassis-body 5 of the carriage. Vertical and parallel plates 8 from a high-strength light material and concave relative to the wind flow are fixed rigidly to upper and lower parts of the frames 7. The chassis-body 5 is mounted through suspensions 9 and bearings (not shown in drawings) upon axes 10 of wheels 11. Each wheel of the carriage should be electrically insulated similar to wheels in subway carriages. Upon said carriage 4 there is at least one electric generator 12 which is fixed from below to the chassis-body 5. The generator rotor is connected with the axis 10 of the wheel. The electric generator is designed to generate electric power when carriage 4 moves along said track 1. The electric generator generates electric power by means of at least one rotating wheel of said carriage and has at least one sliding contact which supplies electric power from said moving carriage to electric power loads. Along said front basic elongated 1A and back basic elongated 1C sections of the track on the leeward side there is a wind directing device 13 (see FIGS. 1, 3, 6, 7, 9) and is at the same height level with said sail assemblies of carriages, designed to direct wind upon said sail assembly 6 of the carriage 4. The wind directing device consists of two parallel vertical frames 14. The lower part of the frames is rigidly fixed to the ground. Rigid edge-bent plates 15 forming channels 16 for directing wind upon said sail assemblies 6 of said carriages 4 are fixed vertically and parallel to the upper and lower frames. The plates 15 are made of a high-strength material and bent along edges to 40–70 degrees. In the front 1A basic elongated section of the track (see FIGS. 6A, 7) plates 15 of the wind directing device 13 are bent to the right downwind. In the back 1C basic elongated section of the track (see FIGS. 6B, 9) plates 15 of the wind directing device 13 are bent to the left downwind.

THE PRINCIPLE OF OPERATION OF THE WIND-DRIVEN POWER STATION

Figure 8:
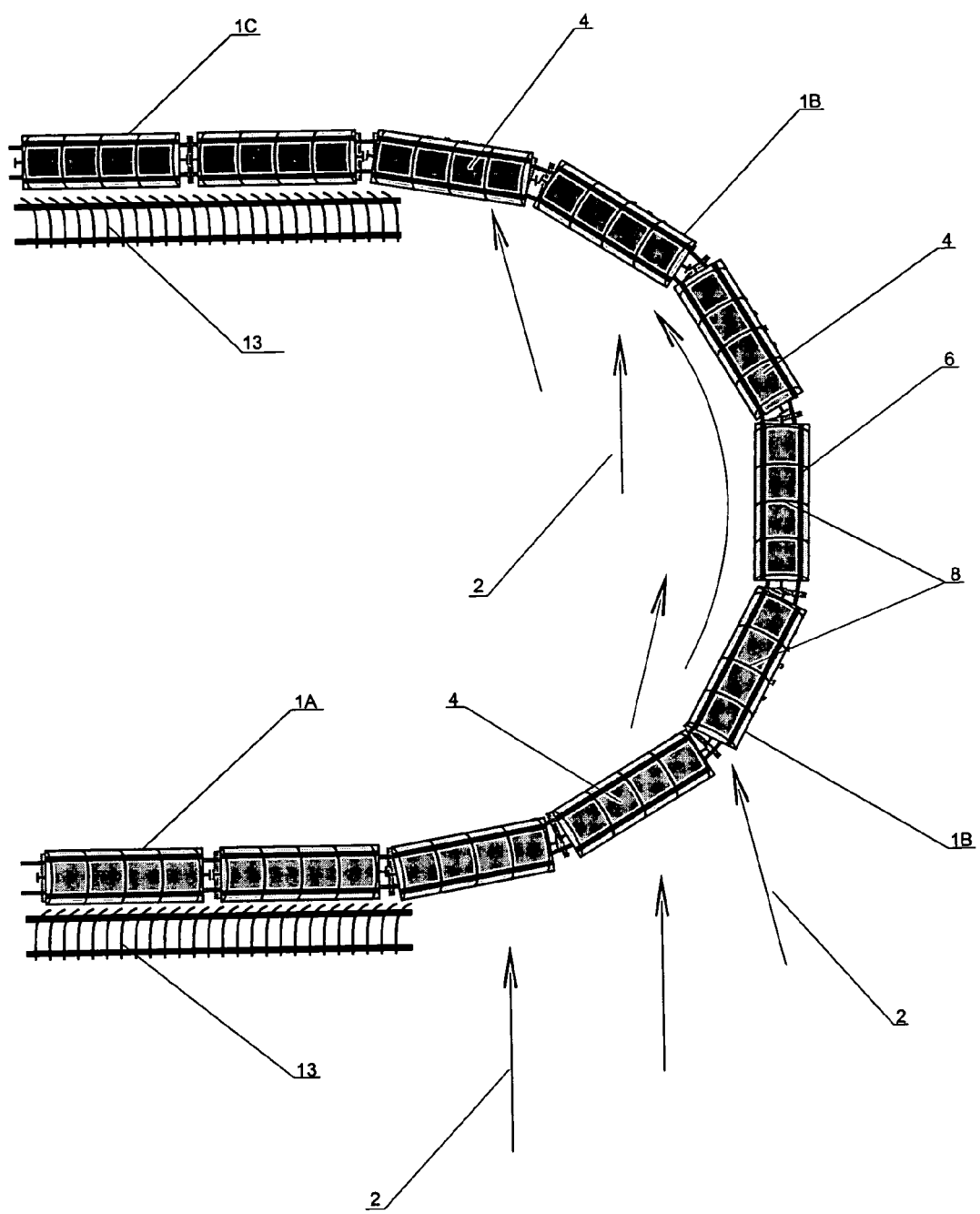
FIG. 8 is a top view of showing a right-hand additional closing section of railway track with railway carriages.

Wind flows 2 (see FIG. 7) passing through channels 16 of the wind directing device 13 change their direction to the right and from the back push plates 8 of the sail assembly 6 and activate the carriage 4 which is placed on the front basic elongated section 1A of the track 1. The carriage 4 placed on this section of the track moves to the right relative to wind direction 2. Wind flows 2 (see FIG. 8) push plates 8 of the sail assembly 6 from the back and activate the carriage 4 which is placed on the right additional closing section 1B of the track 1. The carriage 4 placed on this section of the track moves downwind. At this section of the track there is no wind directing device. Wind flows 2 (see FIG. 9) passing throw channels 16 of wind direction device 13 change their direction to the left and from the back push plates of the sail assembly 6 and activate the carriage 4 which is placed on the back basic elongated section 1C of the track 1. The carriage 4 placed on this section of the track moves to the left relative to wind direction. Since there is a significant difference in height between highest of the track 1 (at the end of the back basic 1C section) and the lowest level of the track 1 (at the start of the front basic 1A section), the carriage 4 when it get into the left-hand additional closing section 1D of the track (see FIGS. 1, 2, 3) go down freely and smoothly in the artificial tunnel upwind and with the heat wind resistance absent.

Thus carriages at each section of the track are influenced by forces which push these carriages in the same direction. When carriages move along the track their wheels rotate and the generator rotor rotates together with them. Hence, electric power is generated and supplied by various poles to the track and from there to electric power loads.

The capacity of the present wind-power station is directly dependent on the wind force and its direction at a given moment, on the weight of carriages, on the height of the wind directing device over the earth and sail assembly of the carriages respectively, total length of the closed track, number of carriages interconnected and moving along the track, total area of plates of sail assemblies mounted on these carriages.

What is claimed is:

1. A wind-driven power station comprising:
   a) a closed-loop track having basic elongated sections positioned across the predominant wind direction in the given area and additional closing sections arranged, accordingly, down and up said predominant wind direction;
   b) said basic elongated sections and one additional closing section of the track arranged down said predominant wind direction are made with a small gradual ascent;
   c) said another additional closing section of the track positioned upwind is made with a smooth descent and placed in a tunnel;
   d) at least one carriage placed to move along said track;
   e) a sail assembly mounted on the said carriage;
   f) at least one electric generator placed on said carriage and designed to generate electric power when carriage moves along said track; and
   g) wind directing device is positioned along the basic elongated sections of the track and designed to direct wind upon said sail assembly.

2. A wind-driven power station of claim 1, wherein said basic elongated sections of the track positioned at different levels relative to height.

3. A wind-driven power station of claim 1, wherein said sail assembly is formed by rigid plates concave relative to the wind flow made from a high-strength light material and fixed to said carriage.

4. A wind-driven power station of claim 1, wherein said electric generator generates electricity by means of at least one rotating wheel of said carriage and has at least one sliding contact supplying electricity from said moving carriage to electrical loads.

5. A wind-driven power station of claim 1, wherein said wind direction device is made as rigid edge-bent plates which form channels to direct wind upon said sail assemblies of said carriages.

* * * * *